US008943174B2

(12) United States Patent
Mildh et al.

(10) Patent No.: US 8,943,174 B2
(45) Date of Patent: Jan. 27, 2015

(54) IDENTIFICATION OF RELAY NODES IN A COMMUNICATION NETWORK

(75) Inventors: Gunnar Mildh, Sollentuna (SE); Peter Moberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1005 days.

(21) Appl. No.: 12/953,923

(22) Filed: Nov. 24, 2010

(65) Prior Publication Data

US 2011/0208842 A1 Aug. 25, 2011

Related U.S. Application Data

(60) Provisional application No. 61/306,316, filed on Feb. 19, 2010.

(51) Int. Cl.

| | |
|---|---|
| ***G06F 15/177*** | (2006.01) |
| ***H04B 7/26*** | (2006.01) |
| ***H04B 7/155*** | (2006.01) |
| ***H04W 24/02*** | (2009.01) |
| *H04L 1/00* | (2006.01) |

(Continued)

(52) U.S. Cl.
CPC .......... *H04B 7/2606* (2013.01); *H04B 7/15507* (2013.01); *H04B 7/15542* (2013.01); *H04B 7/155* (2013.01); *H04W 24/02* (2013.01); *H04L 2001/0097* (2013.01); *H04W 28/26* (2013.01); *H04W 84/047* (2013.01)
USPC .......... 709/220

(58) Field of Classification Search
CPC ............. H04B 7/15542; H04B 7/0413; H04B 7/15507; H04B 7/15; H04B 7/155; H04B 7/2606; H04L 2001/0097; H04W 28/26; H04W 24/02
USPC .......... 709/220
See application file for complete search history.

(56) References Cited

U.S. PATENT DOCUMENTS

| | | | | |
|---|---|---|---|---|
| 2004/0179502 | A1 * | 9/2004 | Naghian et al. | 370/338 |
| 2009/0190521 | A1 | 7/2009 | Horn et al. | |
| 2009/0247120 | A1 * | 10/2009 | Heutschi et al. | 455/406 |

(Continued)

FOREIGN PATENT DOCUMENTS

| | | |
|---|---|---|
| WO | 2010004295 A2 | 1/2010 |
| WO | WO2010104435 | 9/2010 |

OTHER PUBLICATIONS

3GPP TR 36.806 Vo.2.1. (Feb. 2010); 3rd Generation Partnership Project; Technical Specification Group Radio Access Network; Evolved Universal Terrestrial Radio Access (E-UTRA); Relay architectures for E-UTRA (LTE-Advanced) (Release 9); 29 pages.
3GPP "Technical Specification Group Services and System Aspects; General Packet Radio Service (GPRS) enhancements for Evolved Universal Terrestrial Radio Access Network (E-UTRAN) access (Release 9)." Dec. 2009, pp. 59-69, TS 23.401 V9.3.0.

(Continued)

*Primary Examiner* — Larry Donaghue
(74) *Attorney, Agent, or Firm* — Coats & Bennett, P.L.L.C.

(57) ABSTRACT

A relay node identified by a unique relay node identifier relays communications between a donor base station and one or more user terminals. The donor base station acquires the relay node identifier during a relay node attach procedure from where the relay node or another node in the core network (e.g., mobile management entity). The donor base station may use the relay node identifier to retrieve configuration information for the relay node. The configuration information may be used to configure the relay node, to perform radio resource management functions, and/or to monitor the performance of the relay node.

22 Claims, 10 Drawing Sheets

60

62 RECEIVE ATTACH REQUEST FROM RELAY NODE

64 RETRIEVE UNIQUE RELAY NODE IDENTIFIER

66 TRANSMIT RELAY NODE IDENTIFIER TO DONOR BASE STATION

(51) Int. Cl.
*H04W 28/26* (2009.01)
*H04W 84/04* (2009.01)

(56) References Cited

U.S. PATENT DOCUMENTS

2010/0103857 A1* 4/2010 Ulupinar et al. .............. 370/313
2011/0243148 A1* 10/2011 Hurtta .......................... 370/401
2012/0282894 A1* 11/2012 Heutschi et al. .............. 455/406

OTHER PUBLICATIONS

3GPP "Relay Attach Procedure." Jan. 18-22, 2010, pp. 1-5, TSG RAN WG3 Meeting #66bis, R3-100314, Valencia, Spain.
CMCC, "The startup procedure of relay", 3GPP TSG-RAN WG2 Meeting #68, R2-096986, Nov. 9, 2009, pp. 1-3, 3GPP, Jeju, Korea.

* cited by examiner

IDENTIFICATION OF RELAY NODES IN A COMMUNICATION NETWORK

TECHNICAL FIELD

The present invention relates generally to communication networks including relay nodes for relaying communications between a donor base station and one or more user terminals and, more particularly, to methods and apparatus for uniquely identifying relay nodes to the donor base station.

BACKGROUND

In Long Term Evolution (LTE) systems (3GPP LTE Rel-10), the use of relay nodes has been proposed to improve the coverage and capacity of LTE networks. A relay node may be positioned between a base station (called an eNodeB in the LTE standard) and a user terminal (called user equipment (UE) in the LTE standard) so that transmissions between the base station, referred to herein as the donor base station, and the user terminal are relayed by the relay node. Release 10 of LTE supports Type 1 relay nodes, which appear to the user terminal as a separate base station distinct from the donor base station. The service areas covered by a Type 1 relay nodes, referred to herein as a relay cells, also appear to a user terminal as separate cells distinct from the cells of the donor base station. In the following discussion, references to relay nodes are to Type 1 relay nodes unless otherwise indicated.

The relay cells controlled by the relay nodes have their own Physical Cell ID (as defined in LTE Rel-8) and the relay nodes transmit their own synchronization channels, reference symbols, etc. In the context of single-cell operation, the user terminal receives scheduling information and Hybrid Automatic Repeat-reQuest (HARQ) feedback directly from the relay node and sends control information, such as service requests (SRs), channel quality indications (CQIs) and acknowledgements (ACKs) to the relay node. A Type 1 relay node is backward compatible and appears as a base station to Release 8 user terminals. Thus, from the perspective of a user terminal, there is no difference being served by a base station or a Type 1 relay node.

Transmissions between the relay node and the donor base station are over a radio interface called the Un interface. The Un interface, referred to herein as the backhaul link, provides backhaul transport for data transferred between the relay node and all connected user terminals, and the core network. The radio protocols used on the backhaul link are based on the LTE Rel-10 standard. Transmissions between user terminal and relay node are over a radio interface called the Uu interface. The Uu interface is referred to herein as the access link. The radio protocols for the access link are the same as for direct communication between the user terminal and a base station (e.g., donor base station) without a relay node being located in between.

The relay node comprises two main parts: a user terminal part for communicating with the donor base station over the Un interface and a base station part for communicating with user terminals over the Uu interface. The user terminal part behaves similar to a normal user terminal. Thus, normal user terminal access procedures and methods are employed on the Un interface to establish connections between the relay node and the donor base station. These access procedures are described in 3GPP TR36.806, "Evolved Universal Terrestrial Radio Access (E-UTRA); Relay Architecture for E-UTRA (LTE-Advanced) (Release 9)."

When the relay node attaches to the LTE network, it first re-uses the conventional LTE user terminal attach procedure in order to establish Internet Protocol (IP) connectivity with the core network. Once this attach procedure is completed, the relay node contacts an Operations and Maintenance (O&M) system or other network node in the core network to become active as a base station.

Not all relay nodes are expected to have the same hardware and software configuration. Proposals have been made to indicate to the base station that a device attaching to the network is actually a relay node rather than a user terminal. However, no mechanism currently exists to uniquely identify the relay node to the base station or to provide configuration information for the relay node to the base station. Consequently, the donor base station will typically use a default configuration for communications with all relay nodes, which may not be optimal in all cases.

SUMMARY

The present invention provides a method for conveying a unique relay node identification to a donor base station during a relay node attach procedure. The donor base station may use the relay node identification to retrieve configuration information for the relay node from the network. The configuration information may be used to configure radio resources for communications with the relay node. The relay node identifier may also be used to monitor and report the status of the relay node.

In one exemplary embodiment, the relay node stores a unique relay node identifier in its memory. During a relay node attach procedure, when the relay node attaches to the network, the relay node conveys the relay node identifier to a Mobility Management Entity or other entity in the core network. The Mobility Management Entity may then provide the relay node identifier to the donor base station. Alternatively, the relay node may transmit the relay node identifier directly to the donor base station.

In other embodiment of the invention, the relay node identifier is stored in the core network. When the relay node initiates the relay node attach procedure, a Mobility Management Entity or other entity in the core network retrieves the relay node identification and transmits the relay node identifier to the donor base station.

In other embodiments of the invention, a relay node identifier stored by a Home Subscriber Service or other network entity may be used to verify a relay node identifier provided by the relay node during a relay node attach procedure.

In one exemplary embodiment of the invention, a relay node in a communication network relays communications between a donor base station and one or more user terminals. The relay node stores a unique relay node identifier in memory. When the relay node performs a relay node attach procedure to connect the communication network, the relay node transmits the relay node identifier to another network node during the relay node attach procedure. The relay node may transmit the relay node identifier to either the donor base station serving the relay node or to a mobility management entity in the core network.

In another exemplary embodiment of the invention, a mobility management entity in a communication network provides a unique relay node identifier to a donor base station. When the mobility management entity receives an attach request message from a relay node, the mobility management entity retrieves a unique relay node identifier for a relay node from another network node and transmits the relay node identifier to the donor base station during a relay node attach procedure.

In another exemplary embodiment of the invention, a donor base station in a communication network obtains configuration information for a relay node that relays communications between the donor base station and one or more user terminals. The donor base station receives a relay node identifier during a relay node attach procedure and retrieve relay node configuration information for the relay node based on the raly node identifier. The donor base station uses the retrieved relay node configuration information to adapt its configuration when communicating with the relay node. The donor base station may also use the relay node identifier to report relay node failures to the communication network.

Knowledge of the relay node identifier enables the donor base station to obtain configuration information for the relay node. Such information is useful because not all relay nodes are expected to have the same hardware and software configurations. The base station may apply different radio resource configurations to communications with relay nodes having different configurations to improve communications with the relay nodes. The base station can also use the relay node identifier to report problems with the relay node to the O&M system.

DETAILED DESCRIPTION

Figure 1:
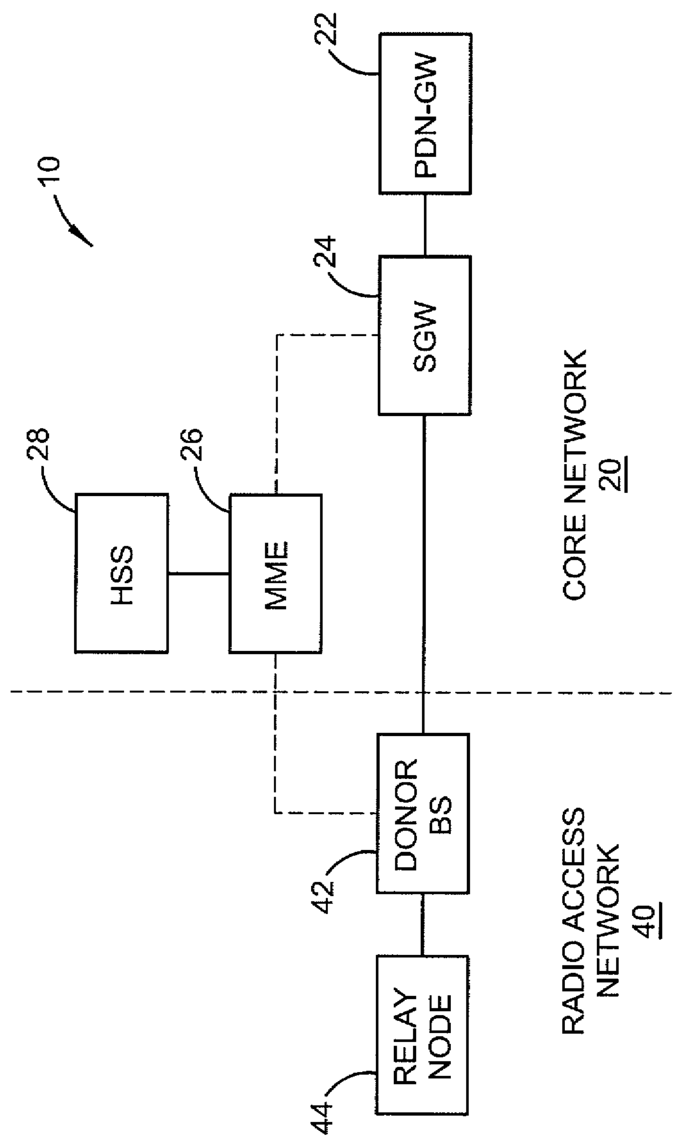
FIG. 1 illustrates the architecture of an exemplary mobile communication network according to one embodiment of the present invention.

Referring now to the drawings, FIG. 1 illustrates an exemplary communication network 10 according to one exemplary embodiment of the present invention. For illustrative purposes, the present invention is described in the context of a Long Term Evolution (LTE) network. However, the principles described herein may also be applied to networks based on other communication standards now known or later developed.

At the highest level, the communication network 10 comprises the core network 20 and the radio access network 40. The core network 20 is responsible for the overall control of the user terminal (not shown) and the establishment of bearers between the user terminal (called user equipment in the LTE standard) and external networks, such as the Internet or other packet data networks (PDNs). The main logical components of the core network 20 comprise the Packet Data Network Gateway (PDN-GW) 22, the Serving Gateway (SGW) 24, the Mobility Management Entity (MME) 26, and the Home Subscriber server (HSS) 28. In addition to these nodes, the core network 20 may include other logical nodes, such as the operations and management (O&M) system (not shown). The PDN-GW 22 provides connection to external packet data networks and is responsible for assigning IP addresses to the user terminals. The SGW 24 serves as a mobility anchor point for the user terminal so that all packets transferred between the user terminal and packet data network pass through the SGW 24. The MME 26 is the main control node and is responsible for mobility management, connection management, and bearer management. The HSS 28 stores subscriber information as well as the current locations of the user terminals. The MME 26 communicates with the HSS 28 when the user terminals attach to the network to authenticate and authorize the user terminals.

The radio access network 40 comprises a network of base stations 42 (called Evolved Node Bs or eNodeBs in the LTE standard), that communicate over the air interface with the user terminals. The base stations 42 provide radio coverage in respective cells 12 of the communication network 10. Although only one base station 42 is shown, a typical access network 40 comprises many base stations 42.

The base station 42 may communicate with user terminals via relay nodes 44. In this case, the base station 42 is referred to as a donor base station. The relay nodes 44 relay signals between the donor base station 42 and one or more user terminals in a relay cell. For downlink communications, the relay node 44 receives signals from the donor base station 42 over the Un interface and transmits signals to the user terminals over the Uu interface. For uplink communications, the relay node 44 receives signals from the user terminals over the Uu interface and transmits signals to the donor base station 42 over the Un interface. The relay node 44 may use the same or different frequencies on the Un and Uu interface.

Figure 2:
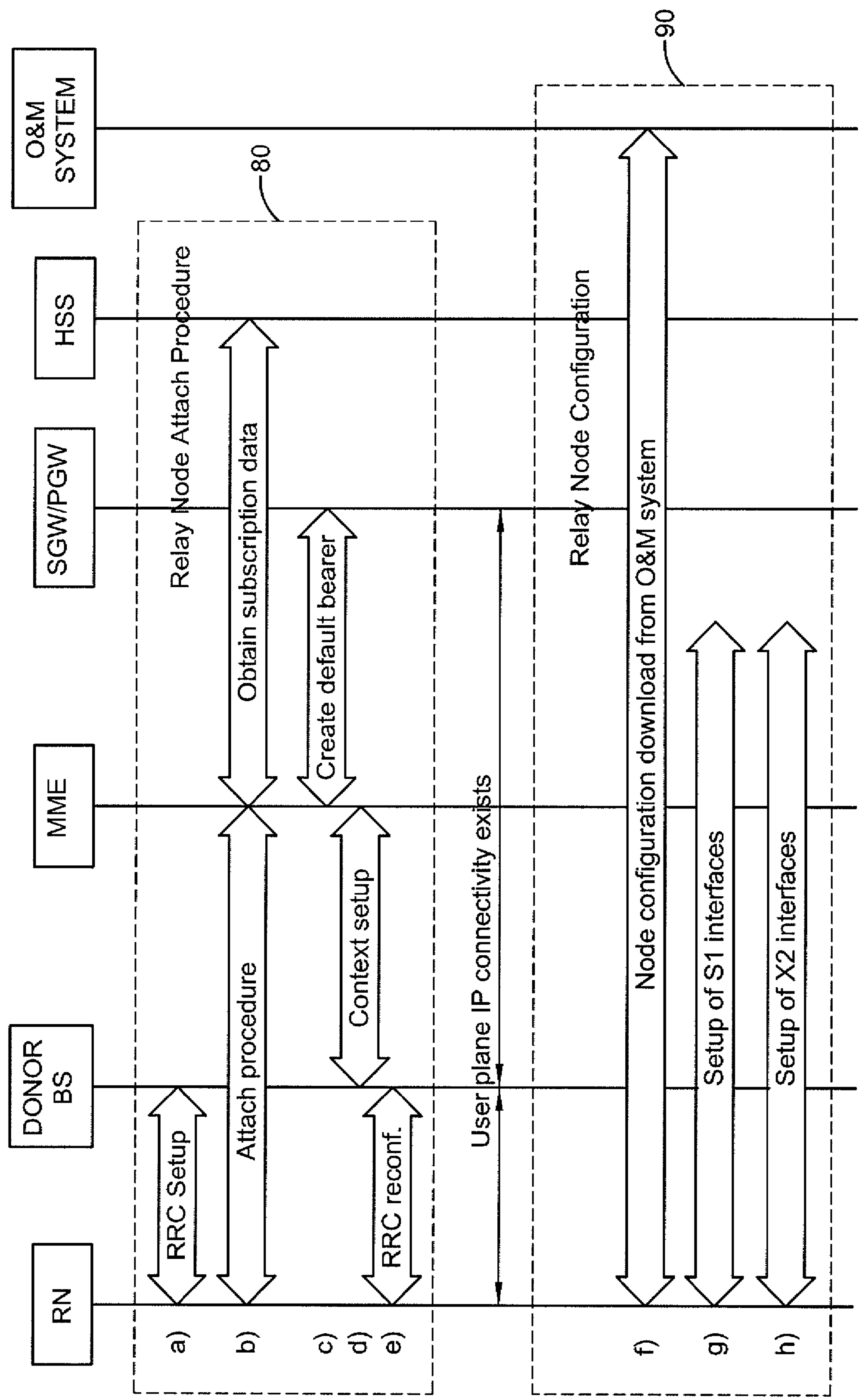
FIG. 2 illustrates an exemplary relay node attach procedure for establishing a connection between a relay node and a base station.

When a relay node 44 is deployed, the relay node 44 attaches to the core network 20 and downloads configuration information from a network node in the core network 20, such as the O&M system. FIG. 2 illustrates an exemplary attachment and configuration procedure for a relay node 44. The relay node 44 initially establishes an RRC connection with a donor base station 42 (step a). Once the RRC connection is established, the relay node 44 executes an attach procedure with the MME 26 in the core network 20 (step b). During the attach procedure, the MME 26 obtains subscription data from the HSS 28, sets up default bearers with the SGW 24 and PDN-GW 22 to carry user traffic (step c), and performs a context set-up procedure to establish a session for the mobile terminal (step d). After the context set-up procedure, the donor base station 42 reconfigures the Radio Resource Control (RRC) connection (step e). When the RRC connection is reconfigured, the relay node 44 may send data to the donor base station 42, which is forwarded by the donor base station 42 to the SGW 24/PDN-GW 22. Following the relay node attach procedure, the relay node 44 may download configuration information from the O&M system or other network node (step f). The relay node 44 may use the configuration information to set up the S1 and X2 interfaces (steps g, h).

The attach procedure has specifically been designed so that the base station 42 does not need to know the unique identifiers, such as the International Mobile Subscriber Identity (IMSI) and International Mobile Equipment Identification (IMEI) of the user terminal or relay node 44. These identifiers are typically transmitted to a Mobility Management Entity (MME) 26 in the core network 20 so the MME 26 and other entities within the core network 20 are aware of these identifiers. The base station 42, however, is only aware of the local identifiers of the user terminal or relay node 44 used on the radio resource control (RRC) connection with the base station 42, such as the cell radio temporary network identifier (CRNTI), and the user terminal specific S1 connection between the base station 42 and MME 26. Furthermore, in many cases, temporary identifiers, such as the Globally Unique Temporary Identifier (GUTI) and Temporary Mobile Subscriber Identity (TMSI), are assigned for communications between the user terminal and the core network, thus avoiding the need to transmit the unique user terminal identifiers (e.g. IMSI, IMEI) over the radio interface and via the base station.

According to embodiments of the present invention, a unique relay node identification (RNID) is defined, which may be provided to the donor base station 42 during the relay node attach procedure. The donor base station 42 may use the RNID to obtain specific configuration information for the relay node 44 and to apply the relay node specific configuration information to communications with the relay node 44. Additionally, the base station 42 may use the relay node configuration information for fault and performance management and other management functions.

In one exemplary embodiment, the RNID is stored in the relay node 44 and conveyed to the donor base station 42 or MME 26 during the relay node attach procedure. The RNID may be conveyed directly to the donor base station 42 via RRC signaling or as part of as part of the S1-Application Part (S1-AP) or EX2 Application Part (EX2-AP) signaling. Alternatively, the RNID may be initially conveyed to the MME 26 as network access stratum (NAS) signaling. The MME 26 may then convey the RNID to the donor base station 42 during S1-AP context set-up. The relay node 44 may be configured to transmit the RNID with or without an explicit request from the base station 42 or MME 26. In all scenarios, the RNID may be conveyed securely using ciphering and/or integrity protection.

In other embodiments, the RNID may be stored by the core network 20, for example, by the HSS 28). In this case, the RNID may be conveyed to the MME 26 during relay node authentication and subsequently to the donor base station 42 during S1-AP context set up. The authentication procedure will typically use another unique identifier, such as the IMSI or IMEI, to identify the relay node 44. The identifier used during the authentication procedure will be different from the RNID. In this case, it is possible to use the RNID stored in the HSS 28 to verify a RNID transmitted by the relay node 44 during the attach procedure as previously described.

Figure 3A:
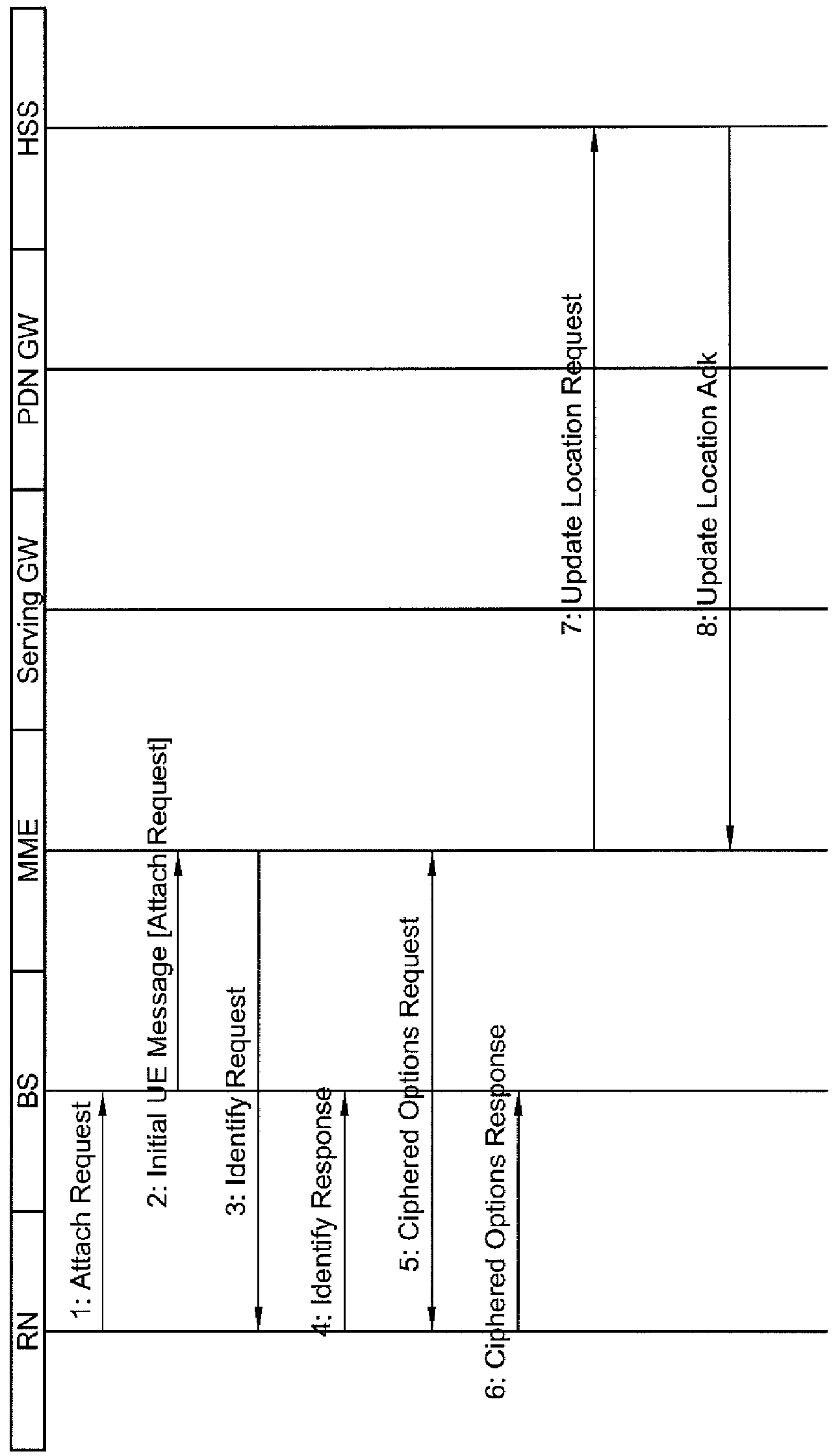
FIGS. 3A-3C illustrate an exemplary relay node attach procedure to establish a connection between a relay node and a base station.
Figure 3B:
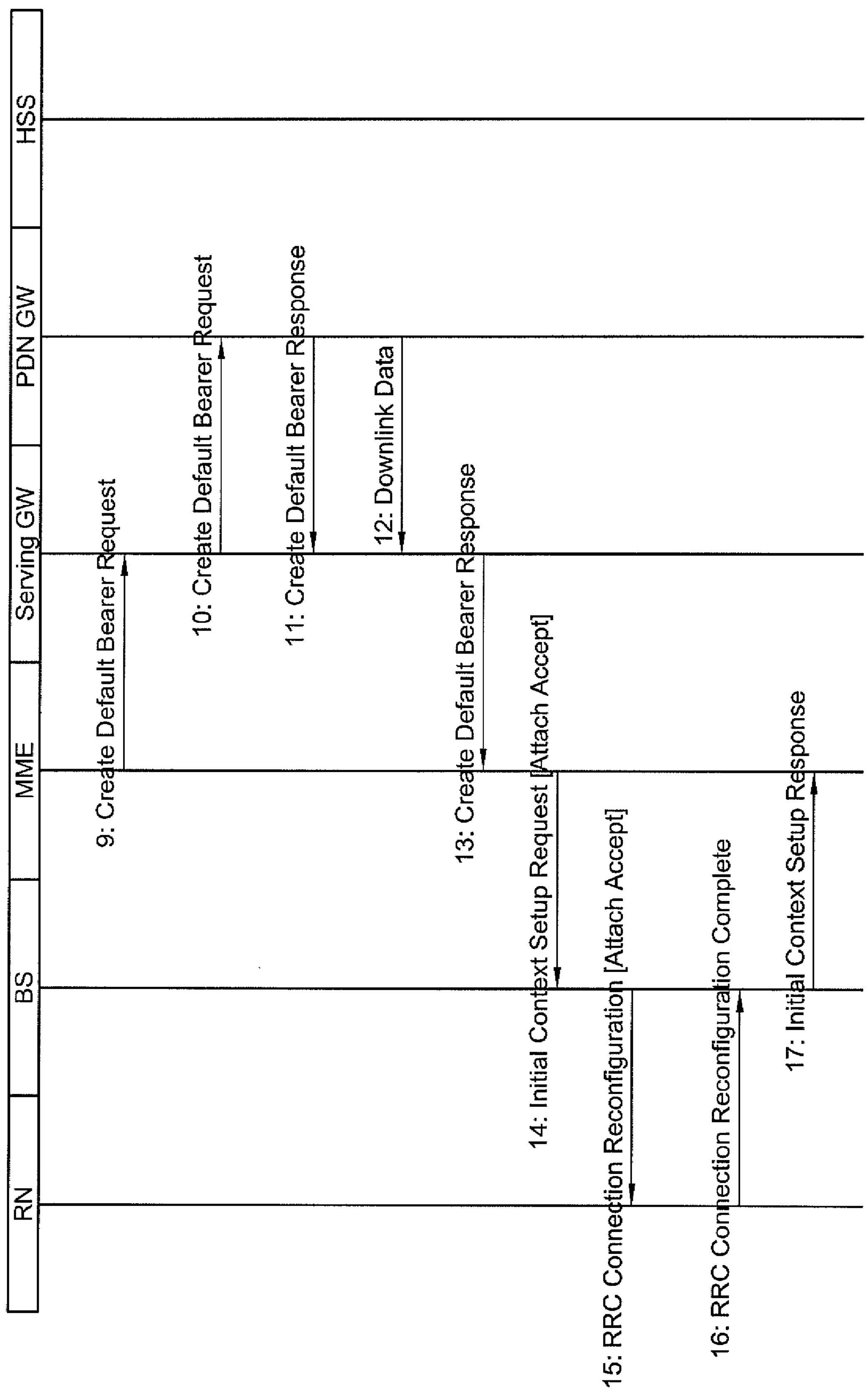
Figure 3C:
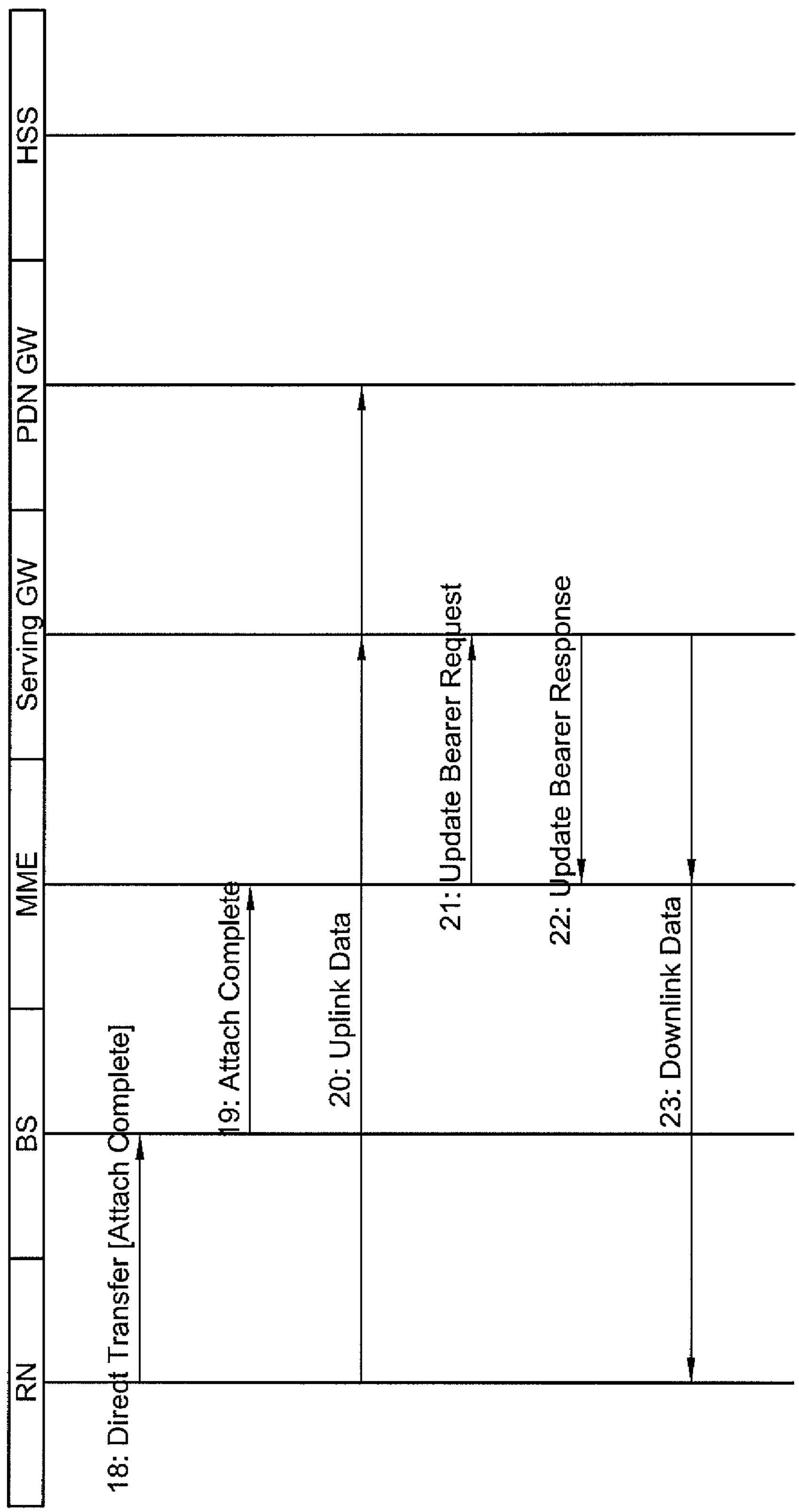

FIGS. 3A-3C illustrate in more detail an exemplary relay node attach procedure as specified by the Third Generation Partnership Project (3GPP) in technical specification TS 23.401, General Packet Radio Service (GPRS) enhancements for Evolved Universal Terrestrial Radio Access Network (E-UTRAN) access (v10.1.0). The relay node 44 initiates the attach procedure by sending an attach request message to the donor base station 42 (step 1). The attach request message will typically include the selected network. In some embodiments of the invention, the attach request message may also include the RNID. The donor base station 42 embeds the attach request message in an initial UE message and forwards the attach request message to the MME 26 for the selected network (step 2). In the example given, it is presumed that the relay node 44 is previously unknown to the MME 26. Accordingly, the MME 26 sends an identify request message to the relay node 44 to request the IMSI (step 3). The relay node 44 responds by providing its IMSI, IMEI, or other terminal identifier in an identify response message (step 4). In some exemplary embodiments, the relay node 44 may also provide the RNID, along with the IMSI or other identifier typically used.

Because no context previously exists for the relay node 44, the MME 26 retrieves the ciphered options from the relay node 44 (steps 5 and 6) and sends an update location request message to the HSS 28 (step 7). The HSS 28 returns subscription data to the MME 26 in an update location acknowledgement message (step 8). The subscription data contains the PDN subscription context. In embodiments when the RNID is stored in the HSS 28, the update location acknowledgement message may also include the RNID of the relay node 44. The MME 26 sends a create default bearer request message to the SGW 24 to initiate default bearer activation (step 9). The SGW 24 sends the create default bearer request message to the PDN-GW 22 (step 10). The PDN-GW 22 creates a new bearer entry in its bearer context table to set up the default bearer and returns a create default bearer response message to the SGW 24 (step 11). At this point, the SGW 24 receives the first downlink data block (step 12). This block is buffered at the SGW 24. The SGW 24 sends a create default bearer response message to the MME 26 to complete the set-up of the default bearer (step 13).

Once the default bearer is established, the MME 26 sends an attach accept message to the donor base station 42 in an initial context set-up request message (step 14). In some embodiments, the MME 26 may send the RNID to the donor base station 42 in the initial context set-up request message. The donor base station 42 forwards the attach accept message to the relay node 44 in an RRC connection reconfiguration message (step 15). The relay node 44 sends an RRC connection reconfiguration complete message to the donor base station 42 to establish the RRC connection with the donor base station 42 (step 16). The donor base station 42 then sends the initial context response message to the MME 26, which includes the address of the donor base station 42 used for downlink traffic (step 17). The relay node 44 sends a direct transfer message to the donor base station 42, which includes the attach complete message (step 18). The donor base station 42 forwards the attach complete message to the MME 26 (step 19). The relay node 44 may then start sending data on the uplink (step 20).

Upon reception of both the initial context response message and the attach complete message, the MME 26 sends an update bearer request message to the SGW 24 and packet buffering is ended (step 21). The SGW 24 acknowledges the update bearer request by sending an update bearer response message to the MME 26 (step 22). The SGW 24 then begins sending its buffered data on the downlink to the relay node 44 (step 23).

In embodiments where the RNID is stored by the relay node 44 and conveyed to the MME 26 in either the initial attach request message or identify response message, the MME 26 may send the RNID to the donor base station 42 in the initial context set-up request message. In some embodiments, the MME 26 may send the RNID received from the relay node 44 to the HSS 28 in the update location request message to verify the RNID. The HSS 28 may verify the RNID and indicate verification in the update location acknowledgement message. The MME 26 may then send the RNID to the donor base station 42 in the initial context set-up request message.

In some embodiments of the invention, the relay node 44 is registered as a user with the HSS 28 and the RNID is stored by the HSS 28. In this case, the HSS 28 may convey the RNID for the relay node 44 to the MME 26 in the update location acknowledgement message. The MME 26 may then forward RNID to the donor base station 42 in the initial context set-up request message as previously described.

In other embodiments of the invention, the relay node 44 may convey the RNID directly to the donor base station 42 in a RRC message during the attach procedure. For example, the relay node 44 may transmit the RNID to the donor base station 42 in the RRC connection reconfiguration complete message. It is also possible to transfer the RNID in earlier RRC messages not shown in FIGS. 3A-3C. For example, the RNID could be included in a RRC message transmitted during setup of the RRC connection as shown in FIG. 2.

The RNID may comprise an arbitrary number or string configured by the operator. Alternatively, the RNID may be related to some other identifier which is relay-node specific. For example, the RNID may include the International Mobile Subscriber Identity (IMSI) (identifying the SIM in the relay node), the International Mobile Equipment Identification (IMEI) (identifying the RN equipment), the EUTRAN Global Cell Identifier (ECGI), (identifying a cell in the RN), or the Global eNodeB Identifier (identifying the base station part of the relay node). Other identities are also possible.

The donor base station 42 may use the RNID to obtain specific configuration information for the relay node 44 from the O&M system. The configuration information may include, for example, information about the relay node hardware or software configuration (such as power, feature support, antennas, capacity, location, etc.). The configuration information may be used for radio resource management (RRM) functionality. For example, the configuration information may be used to support mobility decisions by the donor base station 42, scheduling decisions on the backhaul link, and interference management. The configuration information could also be used for performance monitoring, fault management, configuration management, and to implement self-organizing network functionality.

Figure 4:
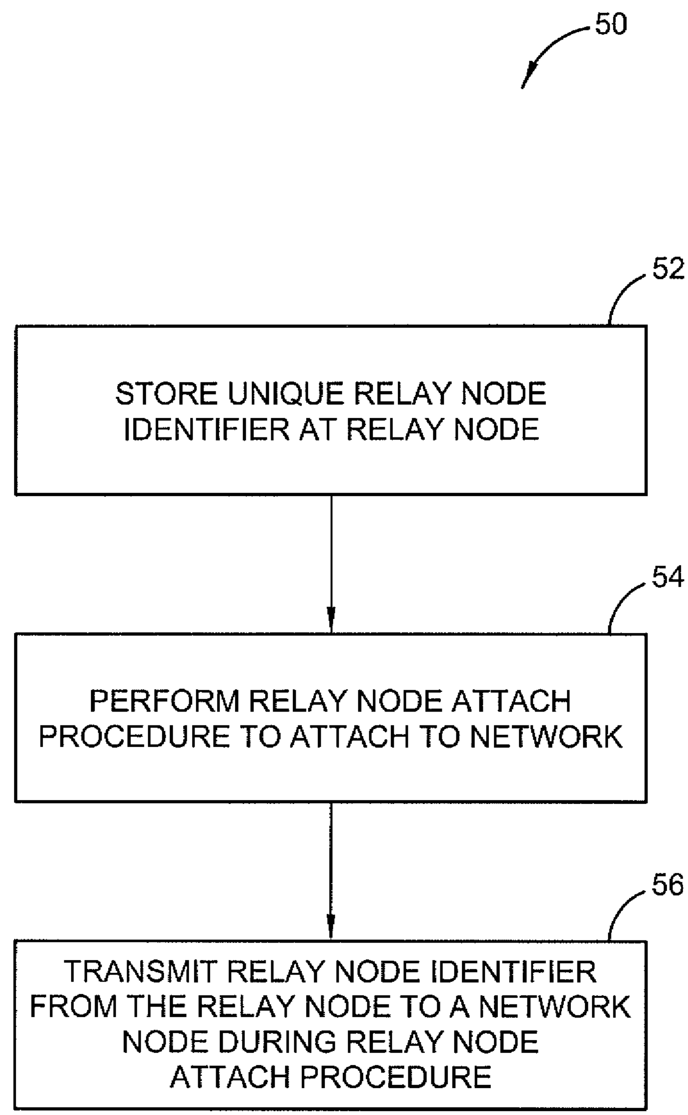
FIG. 4 illustrates an exemplary relay node attach procedure performed by a relay node.

FIG. 4 illustrates an exemplary method 50 implemented by relay node 44 for conveying a RNID. The relay node 44 stores a unique RNID in memory at the relay node 44 (block 52). The RNID may be in any format that identifies the relay node as a relay node. In some embodiments, the relay node 44 may be assigned a standard IMSI or IMEI. The relay node ID may be formed by adding additional bits to the IMSI or IMEI. When the relay node 44 is deployed, the relay node 44 performs an attach procedure to attach to the network 10 (block 54). During the attach procedure, the relay node 44 transmits the RNID to a network node (block 56). As previously discussed, the relay node 44 may transmit the RNID to the MME 26 in an attach request message or in an identify response message. In other embodiments, the relay node 44 may transmit the RNID directly to the donor base station 42 in an RRC connection reconfiguration complete message or other RRC signaling messages. The RNID could also be sent in other messages that are transmitted during the attach procedure.

Figure 5:
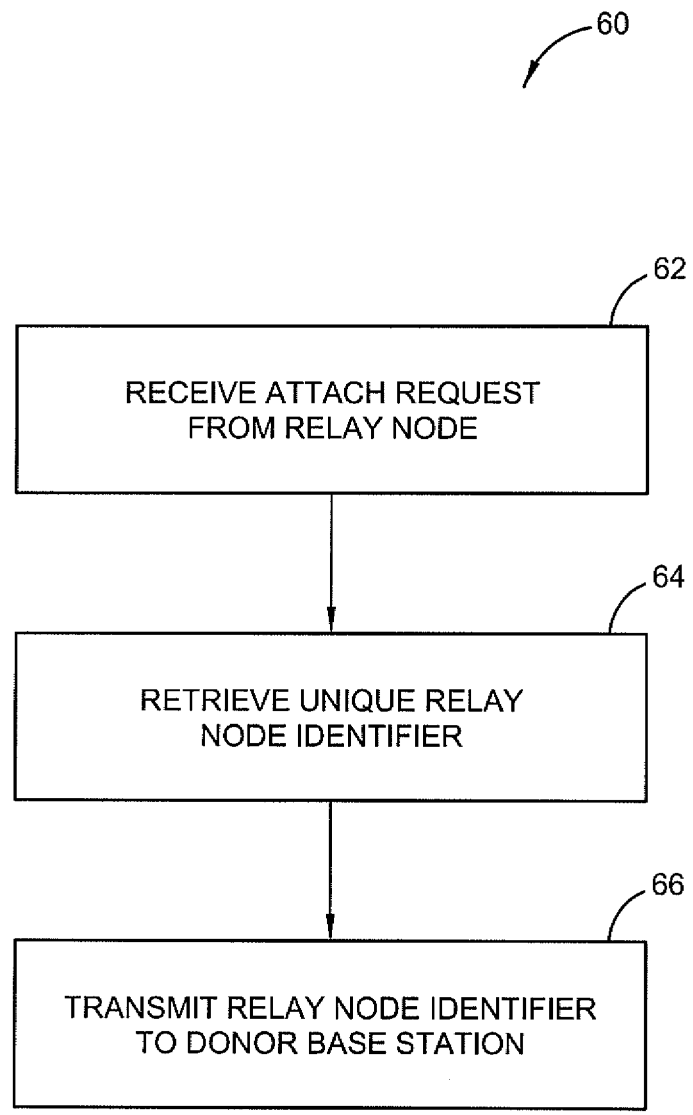
FIG. 5 illustrates an exemplary procedure performed by a network node in a core network for providing a relay node identification to a donor base station.

FIG. 5 illustrates an exemplary method 60 implemented by a network node in the core network 20, such as the MME 26, for providing the RNID to a donor base station 42. The MME 26 receives an attach request message from the relay node 44 (block 62). In response to the attach request message, the MME 26 retrieves a unique RNID (block 64). As previously discussed, the MME 26 may retrieve the RNID from the HSS 28 by sending a update location request to the HSS 28. The RNID may be included in the update location acknowledgement message. After receiving the RNID, the MME 26 transmits the RNID to the donor base station 42. In one exemplary embodiment, the RNID is sent from the MME 26 to the donor base station 42 in an initial context set up request message. As previously noted, this message is sent during the attach procedure to establish an S1-AP context.

Figure 6:
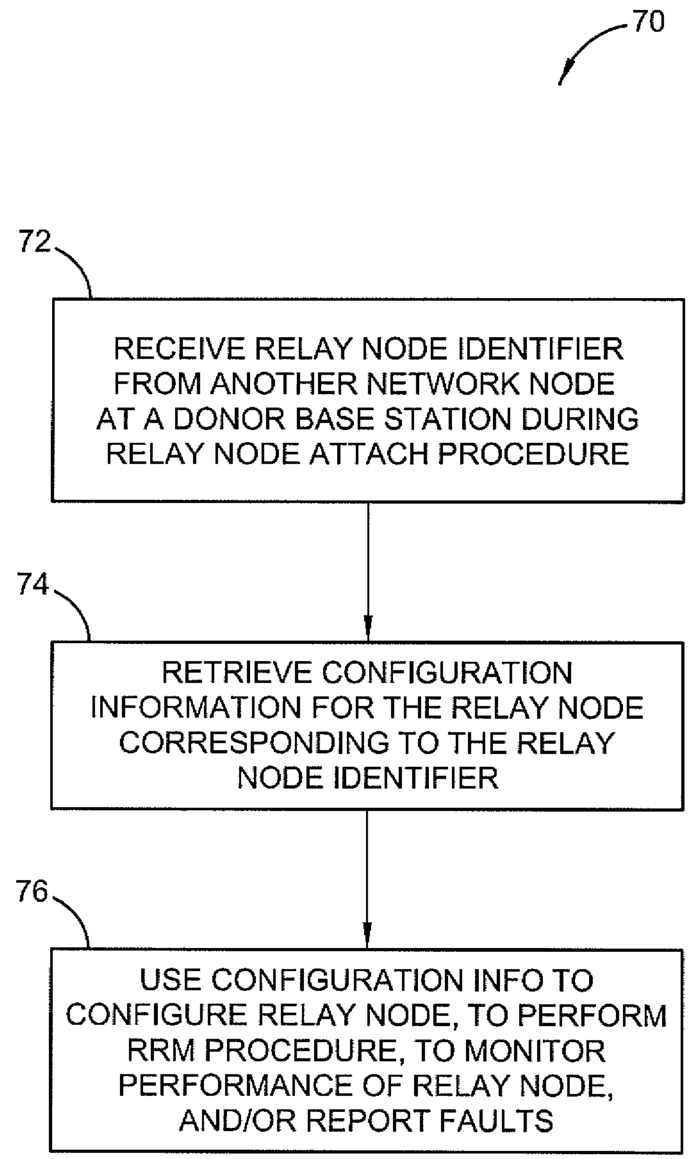
FIG. 6 illustrates an exemplary procedure performed by a donor base station of retrieving configuration information for a relay node.

FIG. 6 illustrates an exemplary method 70 implemented by a donor base station 42 for retrieving configuration information for a relay node 44. To begin, the donor base station 42 receives a RNID (block 72). The RNID may be received during a relay node attach procedure directly from the relay node 44 or from a network node (e.g., MME 26) in the core network 20. In one embodiment, the donor base station 42 receives the RNID from the MME 26 in an initial context set up request message that is sent during the attach procedure. In another embodiment, the donor base station 42 receives the RNID directly from the relay node 44 in an RRC connection reconfiguration complete message or other RRC signaling message. It is useful for the base station 42 to be aware of which relay node 44 it communicates so that it can optimize the resource configuration for this specific relay node 44. When the RNID is received, the donor base station 42 may retrieve configuration information for the relay node 44 from an O&M system or other network node in the core network 20 (block 74). The configuration information may include information about the relay node hardware or software configuration, such as the power, feature support, antennas, capacity, etc.

The base station 42 may use the configuration information to configure radio resources for communications with the relay node 44 and to perform radio resource management (RRM) (block 76). The configuration information may also be used to support mobility decisions and scheduling on the Un link. In some embodiments, the donor base station 42 may execute a procedure to configure the relay node 44 if the relay node 44 is not yet configured or if changes in the configuration of the relay node 44 are needed.

Having a unique relay node identifier at the base station 42 can also be advantageous for operation and maintenance functionality such as fault handling, performance management, etc. Without this information, the fault management and performance tuning might be more difficult to perform (e.g. requires more manual work) because the base station 42 does not know exactly which relay node 44 is associated with a Un connection. For example when a relay node 44 stops working, the donor base station 42 can send a notification message containing the relay node identifier to the operation and maintenance system to indicate that it has lost the radio connection to a specific relay node 44, which can trigger the operator to send out a service team. Without a unique relay node identifier, the operator would have to employ a mechanism to periodically check that the relay node 44 is online (e.g., keep alive signaling).

Figure 7:
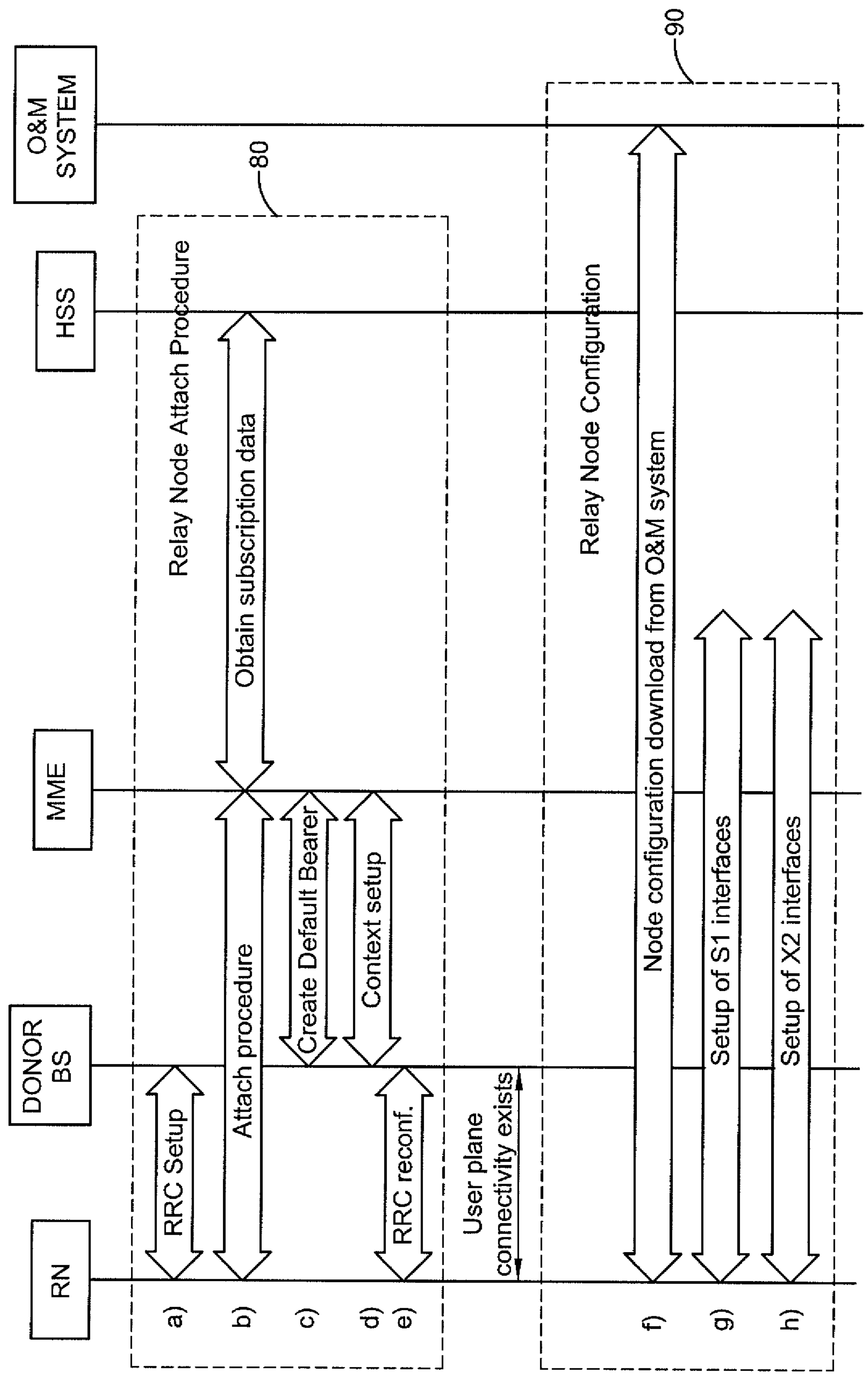
FIG. 7 illustrates another exemplary relay node attach procedure for establishing a connection between a relay node and a base station.

FIG. 7 illustrates an alternative attachment and configuration procedure for a relay node 44 according to another embodiment of the invention. The attachment and configuration procedure shown in FIG. 7 is adapted for use in a network where the SGW 24 for the relay node 44 is incorporated into the donor base station 42. In this embodiment, the relay node 44 initially establishes an RRC connection with a donor base station 42 as previously described (step a). Once the RRC connection is established, the relay node 44 executes an attach procedure with the MME 26 in the core network 20 (step b). During the attach procedure, the MME 26 obtains subscription data from the HSS 28, sets up default bearers to carry user traffic (step c), and performs a context set-up procedure to establish a session for the mobile terminal (step d).

After the context set-up procedure, the donor base station 42 reconfigures the Radio Resource Control (RRC) connection (step e). When the RRC connection is reconfigured, the relay node 44 may send data to the donor base station 42, which is forwarded by the donor base station 42 to the SGW 24/PDN-GW 22. Following the relay node attach procedure, the relay node 44 may download configuration information from the O&M system or other network node (step f). The relay node 44 may use the configuration information to set up the S1 and X2 interfaces (steps g, h).

In the embodiment shown in FIG. 7, the MME 26 will send the Create Default Bearer Request message (message 9 in FIG. 3B) to the donor base station 42 rather than the SGW 24 to initialize the default bearer for the user traffic relayed by the relay node 44. The donor base station creates a new bearer entry in its bearer context table to set up the default bearer and returns send a Create Default Bearer Response message (message 13 in FIG. 3B) to the MME 26. In embodiments where the donor base station knows the RNID of the relay node 44, or where the RNID is provided to the donor base station 42 in the attach request message, the donor base station 42 could include the RNID of the relay node 44 in the Create Default Bearer Response message.

Figures 8, 9, 10:
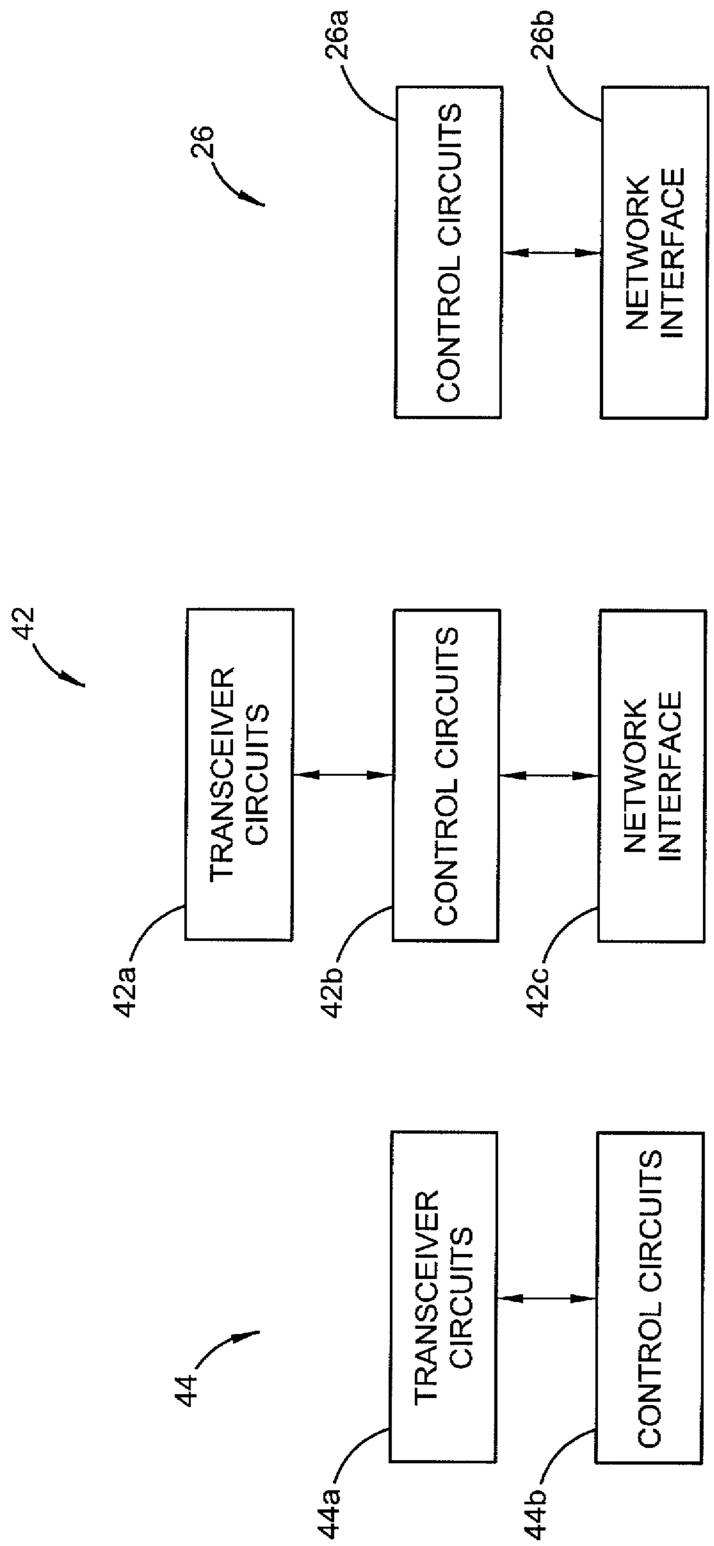
FIG. 8 is a block diagram of an exemplary relay node configured to provide a relay node identification during a relay node attach procedure.
FIG. 9 is a block diagram of an exemplary donor base station that receives a relay node identification.
FIG. 10 is a block diagram of an exemplary network node in a core network for providing a relay node identification to a donor base station.

FIG. 8 illustrates an exemplary relay node 44 according to one embodiment of the invention. The relay node 44 comprises transceiver circuits 44*a* and control circuits 44*b*. The transceiver circuits 44*a* may include a first transceiver for communicating with the donor base station 42 over the Un interface, and a second transceiver for communicating with the user terminals over the Uu interface. Alternatively, the same transceiver circuits may be used for communications on both the Uu and Un interfaces. The transceiver circuits 44*a* may be based on the LTE standard or other communication standards now known or later developed. The control circuits 44*b* comprise one or more microprocessors, hardware, firmware, or a combination thereof, for controlling the operation of the transceiver circuits 44*a*, and associated memory. The functions of the control circuit 44*b* include the implementation of the attach procedure as hereinabove described.

FIG. 9 is a functional block diagram of a donor base station 42. The donor base station 42 comprises transceiver circuits 42*a*, control circuits 42*b*, and a network interface 42*c*. The transceiver circuits 42*a* may comprise a cellular transceiver operating according to the LTE standard for communicating with one or more relay nodes 44 and one or more user terminals 100. Control circuits 42*b* comprise one or more microprocessors, hardware, firmware, or a combination thereof, and associated memory, for controlling the operation of the donor base station 42 as hereinabove described. The functions of the control circuits 42*b* include the implementation of the attach procedure as hereinabove described.

FIG. 10 is a functional block diagram of an exemplary network node, such as an MME 26. The MME 26 comprises control circuits 26*a* and a network interface 26*b*. The control circuits 26*a* comprise one or more microprocessors, hardware, firmware, or a combination thereof, and associated memory, for implementing the functionality of the MME 26. The functions performed by the MME 26 include the attach procedure as hereinabove described. The network interface 26*b* comprises an Ethernet interface or other network interface for communicating with the donor base station 42 and other entities within the core network 20.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. In a mobile communication network having a relay node for relaying communications between a donor base station and one or more user terminals, a method implemented by a mobility management entity of providing a unique relay node identifier to a donor base station comprising:
- receive an attach request message from a relay node;
- retrieving a unique relay node identifier for a relay node from another network node by receiving the relay node identifier from the relay node in the attach request message; and
- transmitting the relay node identifier to the donor base station during a relay node attach procedure.

2. The method of claim 1 further comprising sending the relay node identifier to a home subscriber service for verification before transmitting the relay node identifier to the donor base station.

3. The method of claim 1 wherein retrieving a unique relay node identifier for a relay node from a network node comprises receiving the relay node identifier from the relay node in a response to an identify request message sent by the mobility management entity to the relay node.

4. The method of claim 1 wherein retrieving a unique relay node identifier for the relay node from a network node comprises receiving the relay node identifier from a home subscriber service in response to an update location request message.

5. The method of claim 1 wherein the relay node identifier contains at least one of an International Mobile Subscriber Identity (IMSI) identifying the SIM in the relay node, the International Mobile Equipment Identification (IMEI) identifying the RN equipment, the EUTRAN Global Cell Identifier (ECGI) identifying a cell in the RN, and the Global eNodeB Identifier identifying the base station part of the relay node.

6. A method implemented by a donor base station of obtaining configuration information for a relay node, the method comprising:
- receiving a relay node identifier during a relay node attach procedure by receiving the relay node identifier from a mobility management entity;
- retrieving relay node configuration information for the relay node based on the relay node identifier; and
- configuring the relay node and/or performing a radio resource management procedure based on the relay node configuration information.

7. The method of claim 6 wherein receiving a relay node identifier during a relay node attach procedure comprises receiving the relay node identifier directly from the relay node in an attach request message or radio resource control message.

8. The method of claim 6 wherein the relay node identifier is received from the mobility management entity in an initial context setup request message or attach accept message.

9. The method of claim 7 wherein the relay node configuration for the relay node is retrieved from another network node.

10. The method of claim 7 wherein the relay node configuration for the relay node is stored by the donor base station.

11. The method of claim 6 wherein the relay node identifier contains at least one of an International Mobile Subscriber Identity (IMSI) identifying the SIM in the relay node, the International Mobile Equipment Identification (IMEI) identifying the RN equipment, the EUTRAN Global Cell Identifier (ECGI) identifying a cell in the RN, and the Global eNodeB Identifier identifying the base station part of the relay node.

12. The method of claim 6 further comprising sending a notification message including the relay node identifier from the donor base station to another network node responsive to the loss of a radio connection with the relay node.

13. A mobility management entity comprising:

a network interface; and a control circuit coupled to the network interface and configured to:

retrieve a unique relay node identifier for a relay node from another network node by receiving the relay node identifier from the relay node in an attach request message from the relay node to the mobility management entity; and transmit the relay node identifier to a donor base station serving the relay node during a relay node attach procedure.

14. The mobility management entity of claim 13 wherein the control circuit is further configured to send the relay node identifier to a home subscriber service for verification before transmitting the relay node identifier to the donor base station.

15. The mobility management entity of claim 13 wherein the control circuit is configured to retrieve a unique relay node identifier for a relay node from a network node by receiving the relay node identifier from the relay node in a response to an identify request message sent by the mobility management entity to the relay node.

16. The mobility management entity of claim 13 wherein the control circuit is configured to retrieve a unique relay node identifier for a relay node from a network node by receiving the relay node identifier from a home subscriber service in response to a update location request message.

17. A donor base station comprising:

a transceiver for communicating with a relay node over an air interface;

a network interface for communicating with a mobility management entity in a core network; and a control circuit configured to:

receive a relay node identifier during a relay node attach procedure by receiving the relay node identifier from a mobility management entity;

retrieve relay node configuration for the relay node based on the relay node identifier.

18. The donor base station of claim 17 wherein the control circuit is configured to receive the relay node identifier from the relay node in an attach request message.

19. The donor base station of claim 17 wherein the control circuit is configured to receive the relay node identifier from the relay node in a radio resource control message.

20. The donor base station of claim 17 wherein the control circuit is configured to receive the relay node identifier from a mobility management entity in an initial context setup request message or attach accept message.

21. The donor base station of claim 17 wherein donor base station further includes memory storing the relay node configuration.

22. The donor base station of claim 17 wherein the control circuit is further configured to send a notification message including the relay node identifier from the donor base station to another network node responsive to the loss of a radio connection with the relay node.

* * * * *